(12) United States Patent
Aleshin et al.

(10) Patent No.: US 6,326,585 B1
(45) Date of Patent: Dec. 4, 2001

(54) APPARATUS FOR LASER TWIST WELD OF COMPRESSOR BLISKS AIRFOILS

(75) Inventors: Stephen Aleshin, Muskegon, MI (US); Michael J. Brunck, Cincinnati; Christopher L. English, Mason, both of OH (US)

(73) Assignee: General Electric Company, Cincinnati, OH (US)

( * ) Notice: Subject to any disclaimer, the term of this patent is extended or adjusted under 35 U.S.C. 154(b) by 0 days.

(21) Appl. No.: 09/353,487

(22) Filed: Jul. 13, 1999

Related U.S. Application Data
(60) Provisional application No. 60/092,805, filed on Jul. 14, 1998.

(51) Int. Cl.[7] .................................................. B23K 26/00
(52) U.S. Cl. ........................ 219/121.63; 219/121.64; 219/121.83; 219/121.84; 219/121.85; 219/121.86
(58) Field of Search ..................... 219/121.63, 121.64, 219/121.83, 121.84, 121.85, 121.86

(56) References Cited

U.S. PATENT DOCUMENTS

| | | | |
|---|---|---|---|
| 4,730,093 | 3/1988 | Mehta et al. | 219/121.63 |
| 4,743,733 | 5/1988 | Mehta et al. | 219/121.66 |
| 4,804,815 | 2/1989 | Everett | 219/121.66 |
| 4,998,005 | 3/1991 | Rathi et al. | 219/121.83 |
| 5,038,014 | 8/1991 | Pratt et al. | 219/121.64 |
| 5,160,822 | 11/1992 | Aleshin | 219/121.64 |
| 5,168,141 * | 12/1992 | Tashjian et al. | 219/121.63 |
| 5,245,155 * | 9/1993 | Pratt et al. | 219/121.63 |
| 5,554,837 | 9/1996 | Goodwater et al. | 219/121.63 |
| 5,622,638 | 4/1997 | Schell et al. | 219/121.64 |
| 5,643,477 * | 7/1997 | Gullo et al. | 219/121.86 |
| 5,914,059 | 6/1999 | Marcin, Jr. et al. | 219/121.66 |

\* cited by examiner

*Primary Examiner*—M. Alexandra Elve
(74) *Attorney, Agent, or Firm*—Andrew C. Hess; David L. Narciso

(57) ABSTRACT

Apparatus for performing laser weld repair of complex titanium-base material parts for gas turbine engines. The complex arts, typically compressor blisk airfoil assemblies are enclosed in a local dry box and purged in an inert gas atmosphere. Laser weld repairs are accomplished within this dry box by using a coaxial nozzle and a mixture of helium and argon. The welding is accomplished by maintaining a proper standoff between the weld nozzle and the weld. The welding is monitored and controlled from a remote location using in a video camera system. Copper shielding is provided within the dry box to protect areas adjacent to the weld area from overheating and weld spatter.

7 Claims, 4 Drawing Sheets

APPARATUS FOR LASER TWIST WELD OF COMPRESSOR BLISKS AIRFOILS

CROSS REFERENCE TO RELATED APPLICATION

This application claims the benefit of U.S. Provisional Application No. 60/092,805, filed Jul. 14, 1998.

BACKGROUND OF THE INVENTION

1. Field of the Invention

The invention relates to improved apparatus and method for repairing a metallic portion of an article using a metal powder and a laser beam, and specifically to repairing a blisk assembly such as are found in gas turbine engines.

2. Description of the Prior Art

An aircraft gas turbine engine or jet engine draws in and compresses air with an axial flow compressor, mixes the compressed air with fuel, burns the mixture and expels the combustion product through an axial flow turbine that powers the compressor. The compressor includes a disk with blades projecting from its periphery. The disk turns rapidly on a shaft, and the curved blades draw in and compress air. In the past, the blades and the disk were structures that were manufactured separately and assembled together. More recently, the blades have been manufactured integral with the disk forming a single integral structure known as a blisk.

Blisk components manufactured by all known methods of manufacture (milling, electrochemical machining) are subject to foreign object damage (F.O.D.) of the airfoils. This can occur during the original manufacturing process or during field service of the blisk. In either case, repair of the damaged region is often desirable due to the high replacement cost of the components. To date, the only repair method demonstrated on an engine test is mechanical removal of the damaged material and essentially leaving the blisk as-is. While this repair method is suitable for minor airfoil edge damage, it is not acceptable for more significantly damaged areas due to imbalance problems and potential mechanical property degradation. Severe airfoil damage, as experienced by the XTC46 Core Driven fan Stage (CDFS), requires a complete replacement of airfoil material from the midspan shroud outward.

Techniques have been developed for forming a compressor blade integral with a substrate in new manufacture. One technique deposits layers of filler material on a substrate through the interaction of a laser beam. A CNC program is used to control the shape of the deposit, and a contoured buildup of suitable height is achievable through multiple layer buildups, with each layer having the desired geometry. Apparatus for performing controlled laser deposition of material on a substrate is described in U.S. Pat. No. 4,730,093, and this technique is described in U.S. Pat. No. 5,038,014, both of which U.S. Patents are incorporated herein by reference. While the technology described in these patents has been used to successfully repair minor damage to titanium (Ti 6-4) materials by applying the same feed or replacement material as the damaged base materials, no large scale repairs have been accomplished, and no repairs have been performed by depositing a feed or replacement material that is different than the substrate base material.

One of the problems experienced in attempts to manufacture and repair items using laser welding techniques such as described above include low integrity welds. These low integrity welds have been due to oxygen and nitrogen pickup due to loss of the argon cover over the molten weld metal, referred to as the weld puddle. Contamination due to oxygen and nitrogen causes a brittle weld repair, which is an unacceptable result for an airfoil repair. Impact due to foreign object ingestion by a gas turbine engine could result in a failure of the repaired area, that could lead to separation of the portion of the blade above the repaired area.

Drawbacks with the system set forth in these patents include operator fatigue. Even though the system is computer controlled, an operator must visually observe the application of the powder and must override the system if there is any deviation form the computer controlled program. Furthermore, as noted in the prior art patents, the systems are sensitive and failure to override in a timely fashion can lead to an unacceptable region of repair. Also, the systems of the previous patents relies upon an argon feed to assist in carrying the powder from the reservoir to the article and to shield the pool of molten metal, and upon a short interaction time of the powder in the molten pool created by the laser. However, problems with this technique are frequent loss of the protective argon gas over the molten metal, as set forth above. Spattering of molten metal onto adjacent blades and the undesirable heating of adjacent blades from laser energy reflections from the weld pool due to the close arrangement of blades around the blisk pose additional problems.

SUMMARY OF THE INVENTION

In accordance with the present invention, it is desirable to provide a laser twist weld (LTW) repair of compressor blisk airfoils. These airfoils are of a complex configuration, having a curvicular shape. The airfoils can be characterized as a plurality of substantially parallel cross sections of predetermined thickness extending from the base of each airfoil outward toward the tip of the airfoil. The airfoils are repaired by depositing at least one bead weld filler material on the underlying substrate corresponding to the predetermined thickness of the cross section. Typically, it is necessary to deposit two or three parallel beads of predetermined thickness in order to obtain the desired cross section. LTW can also be used to provide a replacement of contoured blisk airfoils. Following suitable post-weld heat treatment (PWHT), the blisk airfoils are machined to the desired geometry and inspected for assurance of weld integrity. Compressor blisk airfoil replacement may use dissimilar materials for the substrate portion and the airfoil portion (e.g., Ti-17 replacement material for Ti-6242 blisk base metal), or it may utilize as replacement material the same composition as the damaged material. The advantage of the bi-alloy repair process is that it allows both the disk and airfoil materials to be optimized independently, and can also result in improved weldability of the deposited material, which may not be achievable when using replacement material that is the same as the damaged material.

A fixture, a local dry box, provides a convenient means for enclosing a portion of the substrate being welded, usually several airfoils at a time, to allow a clean dry argon atmosphere to be maintained over the weld pool and in the region adjacent to the welding. The fixture also encloses at least a tip of the weld nozzle. This results in deposits having minimal contamination, which is essential when welding titanium materials. The need for gas shielding in the vicinity of the weld does not limit the process to the use of compact dry box; a larger argon filled enclosure that covers the entire part could be used and may reduce weld repair cycle time.

A laser weld feed nozzle is used for blisk repair to accomplish material deposition. The nozzle includes a powder feed system having two copper feed lines connected at one end to a supply of powder material and inert gas and at the other end to a powder "outer" feed nozzle which in turn is connected to an "inner" nozzle, as opposed to a single feed line separate from laser nozzle. This "coaxial" powder feed system differs considerably from the "single point" powder feed system described in U.S. Pat. No. 5,038,014, which patent is incorporated herein by reference. This design allows for multidirectional processing and more uniform deposition compared to prior art designs. Attached to the nozzle or provided as an integral part of the nozzle is a laser that provides the energy for heating the filler metal and the substrate coaxially with the powder feed or filler material. Also included as a part of the laser weld feed nozzle is a copper chill positioned at the nozzle tip at the end opposite the laser.

A means for viewing the substrate being welded is provided by a video system that is also used to monitor the amount of material deposited and to determine the upward movement of the nozzle assembly required after each layer to maintain the proper nozzle to part standoff. Although the means for monitoring the standoff may be an automatic system that can be associated with a means for adjusting the position of the tip of the weld nozzle in relation to the weld pool when the relationship of the position of the weld nozzle to the weld pool is outside of predetermined limits, the means for monitoring and the means for adjusting can be remotely performed by a properly trained operator.

In order to minimize heat buildup and subsequent distortion, airfoils are systematically deposited at 90° increments, as opposed to being sequentially being deposited adjacent to the prior deposited airfoil.

Copper shielding is used on adjacent blades to minimize the impact of laser reflections from the weld pool of the airfoil being repaired. Without the shields, such reflections cause overheating of adjacent blades. The shielding also protects the blades from the effects of weld spatter.

A "double-pass" weld deposition technique is employed in which the width of the deposit is increased by depositing two (2) layers side by side, as opposed to a one-pass method. At the root region, where increased width is required, three or more passes are utilized. Means for controlling the weld deposition is provided by a nozzle that is preprogrammed to follow a predetermined path at a predetermined speed for each path.

The improved method allows for deposition of weld material on thin substrates, as thin as or thinner than 0.125" such as is typically found with the midspan shroud of a compressor blisk. Such repairs can be performed on substrates that are significantly thinner than substrates previously repair welded using prior art techniques.

Following welding, inspection and heat treatment, the near net shape airfoil deposits are milled to finished dimensions using a CNC cutting program and a 5-axis milling machine. Cutting forces and material removal rates are minimized to reduce airfoil deflection, producing more precise cuts. Cutter geometries (spiral type, type of cut) are selected in conjunction with the CNC milling path to minimize airfoil vibration, especially at the leading and trailing edges. Manual benching of the milled airfoils surfaces and edges is used to yield the desired surface finish and edge geometry.

An advantage of the present invention is the ability to produce a weld that is free of material contamination from oxygen and nitrogen pick-up as a result of the loss of inert gas cover over the weld pool, thereby resulting in a repair that is ductile and less susceptible to failure due to brittle fracture.

Another advantage of the present invention is the ability to weld repair large portions of blisks without spattering molten metal onto the surfaces of adjacent blades and without undesirably heating blades adjacent to the blade under repair.

Yet another advantage of the present invention is the ability to accurately monitor the weld repair remotely. Although still dependent upon the skill of the operator to detect variations, fatigue factors that adversely affect the operator can be minimized.

A fourth advantage of the present invention is the ability to repair an article such as a blisk using a feed or replacement material different from the original material in order to obtain optimum properties.

Still another advantage of the present invention is that the process utilizes minimal tooling, the laser being the most expensive tool, yet permits repair or replacement of entire airfoils. Furthermore, airfoils of varying configuration can be repaired with virtually the same equipment. Not only is the repair cost effective from an equipment standpoint, but also the ability to reuse an expensive blisk provides additional cost benefits.

The apparatus and process of the present invention also permit repair on substrate materials having a thickness of 0.125 inches and less, without burn-through and without adversely affecting the thin portion of the substrate opposite the weld repair.

Other features and advantages of the present invention will be apparent from the following more detailed description of the preferred embodiment, taken in conjunction with the accompanying drawings which illustrate, by way of example, the principles of the invention.

DESCRIPTION OR THE PREFERRED EMBODIMENTS

The present invention is directed to an improved method for performing LTW repairs. Because the disks and blades of compressors are being manufactured as integral structures, an improved method of repairing blisks either prior to being placed into service because of manufacturing operations resulting in components not in conformance to drawing requirements or after removal from service due to service-induced damage is required.

Figure 1:
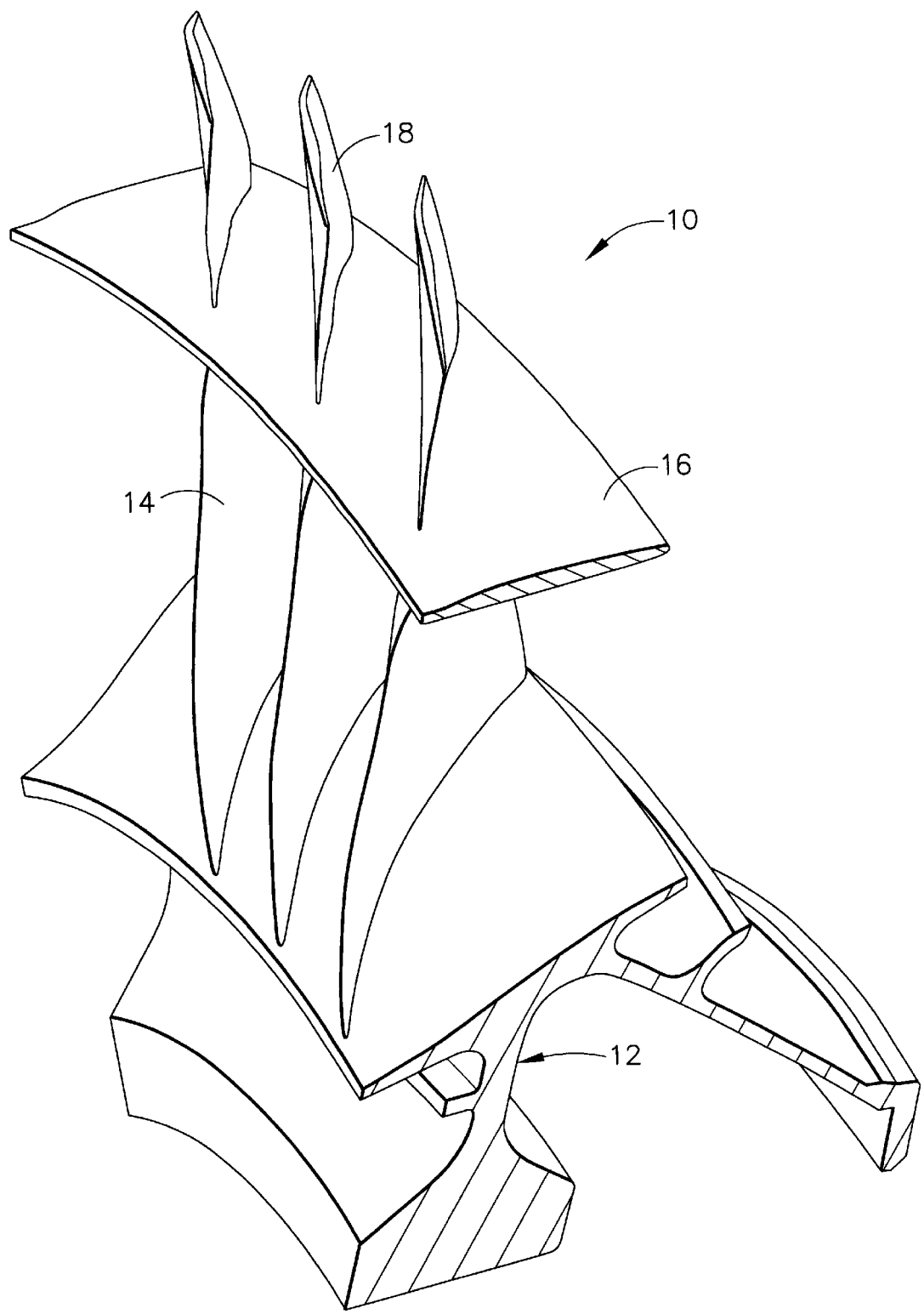
FIG. 1 is a contoured blisk assembly having a midspan shroud.
Figure 2:
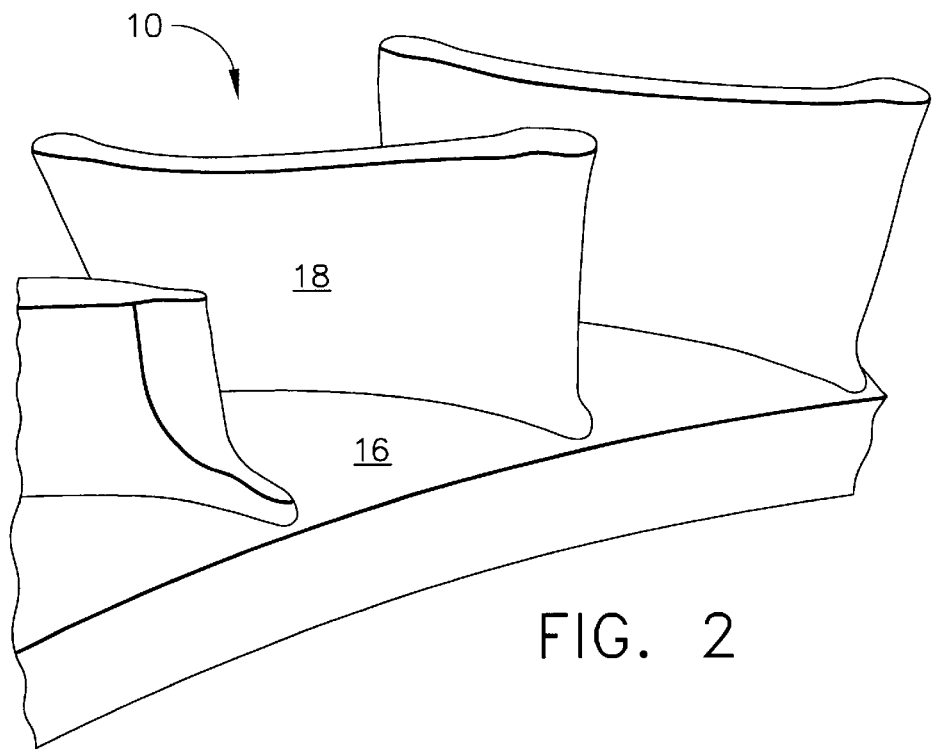
FIG. 2 is an exploded view of a portion of the blisk assembly of FIG. 1.

A typical blisk assembly is shown in FIG. 1. This blisk assembly is similar to the blisk for a XCT46 stage 1. This blisk assembly 10 includes a central disk 12, with compressor blades 14 extending outward from the central disk, as is typical with all blisk and disk/blade assemblies. However, this blisk also incorporates an integral 360° midspan shroud 16 outward from the central disk as is sometimes found in compressors, with outer blade portions 18 extending outwardly from the midspan shroud 16. This is shown in an exploded view in FIG. 2. The apparatus and method of the present invention may be used for blisks with or without midspan shrouds.

In preparation for weld repairs, damaged outer blade portions 18 are first removed. For the blisk shown in FIG. 1, the outer blade portions 18 to the midspan shrouds are removed. The removal can be accomplished by any technique and it is not necessary to remove to the midspan shroud, so long as a clean, consistent and weldable surface is produced. Preparation can be accomplished through a combination of hand working and machine set-ups. Mechanical working can be followed by a chemical cleaning step, such as chemically removing a small amount of material, for example, about 0.0002" of material, followed by wire brushing and cleaning with an evaporable solvent such as methyl ethyl ketone. These steps assure the removal of all surface contaminants. Appropriate preparation of the surface to be welded is an important aspect of accomplishing a successful weld. Not only is weld prepping of the substrate to assure an appropriate geometry so that constant spacing between part surface and the nozzle during welding critical, but also the substrate must be clean to assure proper fusion with the filler material.

Figure 3:
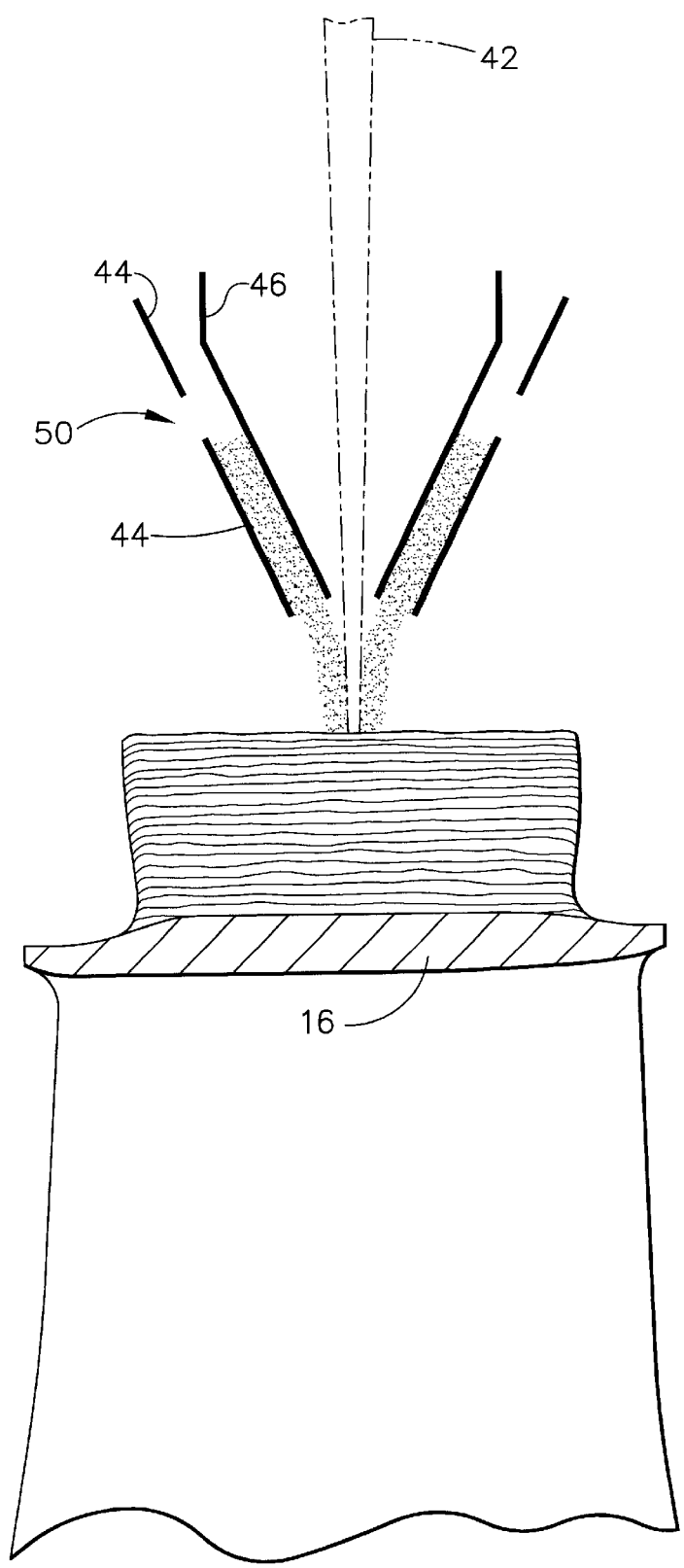
FIG. 3 schematically represents deposition of powder filler material through a powder nozzle onto a substrate, utilizing a laser beam, with relative motion between the substrate and nozzle.

After the substrate is prepared for welding, welding is accomplished using the apparatus of the present invention, which includes a coaxial weld feed nozzle for laser welding the region under repair. FIG. 3 schematically represents deposition of powder filler material through a powder nozzle onto a substrate, utilizing a laser beam, with relative motion between the substrate and nozzle. The present invention also includes a novel enclosure that surrounds the nozzle and at least the blade portion under repair, and typically the blades immediately adjacent to blade under repair. A video monitoring system also is provided to remotely monitor the welding occurring in the enclosure.

Figure 4:
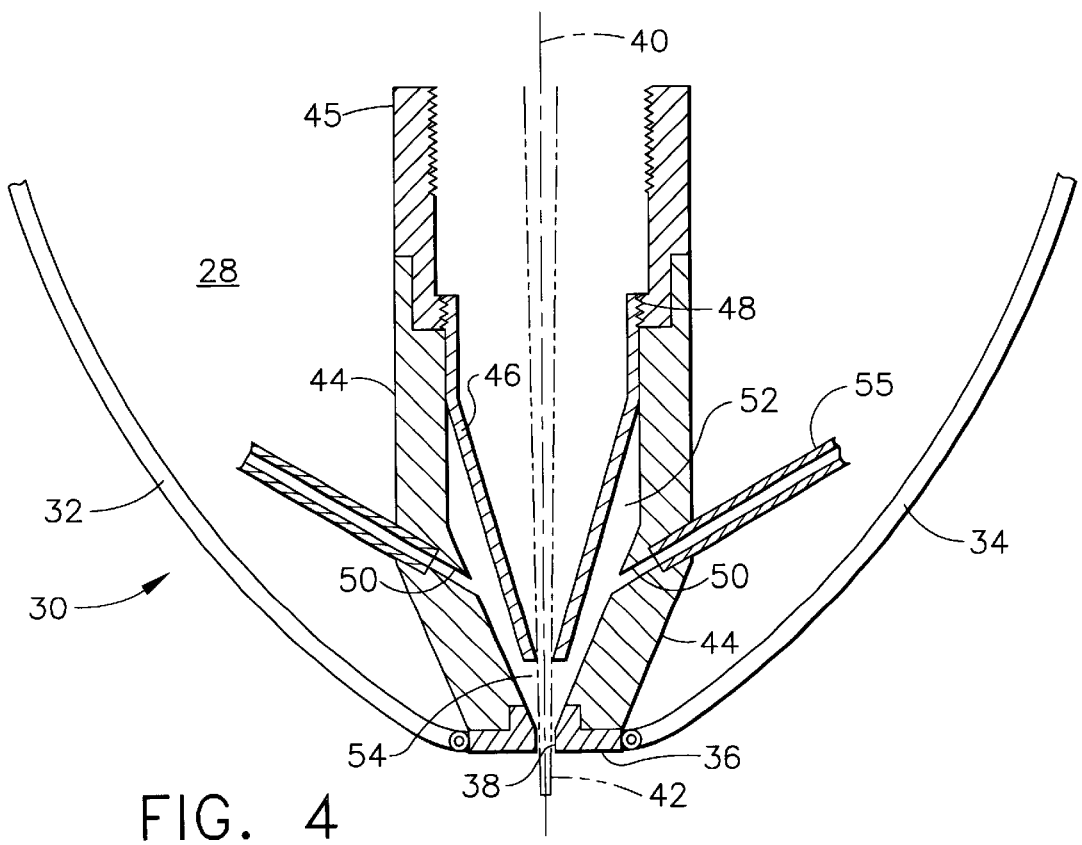
FIG. 4 is a cross-sectional view of the laser nozzle of the present invention.

The weld head 28 for performing the repairs of the present invention is comprised of a laser, a powder delivery system and a nozzle head configuration, a portion of which is shown in FIG. 4. Any laser may be used, but a preferred laser is a Spectra Physics 975, a 5 KW laser, using an Aerotech Unidex 16 Controller. Powder is fed to the weld head using a modified Metco 3MP powder feeder. The powder is delivered through a co-axial powder feed nozzle having a configuration as shown in FIG. 4. The tip of nozzle 30 includes means for cooling in the form of a water inlet line 32 and a water outlet line 34 which supply water to a copper chill 36. As shown, the means for cooling is integral with an outer nozzle 44. An aperture 38 at the tip of the nozzle and extending along the centerline 40 provides a passageway for laser beam 42. The feed nozzle is movable along a tri-axial coordinate system having X, Y and Z axes. As shown in FIG. 4, the outer nozzle 44 is attached to copper chill 36 and includes a central bore that encompasses at least the centerline 40 of the nozzle. Outer nozzle 44 is attached to adapter ring 45. Although any means of attachment may be used, such as threaded connections or pin attachments, outer nozzle 44 was attached to adapter ring 45 by means of a slip fit and secured to adaptor ring 45 with set screws, not shown. Adaptor ring 45 is coupled to inner nozzle 46 by a threaded connection 48. Inner nozzle 46 also has a central bore that encompasses the centerline of the nozzle. But, other methods of assembling inner nozzle 46 to outer nozzle 44 may be utilized. However, the preferred method of assembly is having the inner and outer nozzle assembled and removably connected to each other using adaptor 45. This permits ease of removal of inner nozzle 46 from outer nozzle 44. However, the nozzle may be manufactured as a integral piece having an inner nozzle portion and an outer nozzle portion.

At least one passageway 50 extends through outer nozzle 44 and into outer annular region 52. This passageway 50 in the preferred embodiment is an orifice that extends between outer nozzle 44 and inner nozzle 46. The passageway provides a fluid connection between an outer annular region 52 and powder feed line 55. Outer annular region 52 is formed between outer nozzle 44 and inner nozzle 46. Powder feed material (not shown) carried by an inert carrier gas, preferably argon, is delivered to outer annular region 52 by copper feed lines 55 and then through passageway 50 into outer annular region 52. Both the copper powder feed lines 55 and the water cooling lines preferably are secured to the exterior of the nozzle and laser tube to assist in restricting movement of the lines.

The feed material is fed downward through inner annular region 54 positioned below inner nozzle 46 so that it is flowing in a direction substantially parallel with the centerline of the nozzle below inner nozzle 46. The region below inner nozzle 46 is an interaction zone for the powder and laser beam 42. Laser beam 42 passes along centerline 40 along with helium gas flowing at a rate of 25 cfh and argon flowing at a rate of 10 cfh. This mixture is introduced into inner annular region 54 above the interaction zone, and mixes with the powder and the argon gas in the interaction zone. In the interaction zone, the powder is directed by the gases in such a way as to minimize melting of the powder particles by laser beam 42 in this region. The powder is then carried into the weld puddle where it is consumed to form a buildup.

Copper chill 36 provides cooling to the nozzle, since any portion of laser beam 42 that is deflected or reflected internally within nozzle 30 or laser energy and weld spatter reflected toward the nozzle from the weld pool will undesirably heat the nozzle. An inert gas atmosphere of argon is maintained around the nozzle and over the weld pool, as will subsequently be explained. Sufficient argon gas flow is provided to the nozzle to cause turbulence to prevent an accumulation of powder in outer annular region 52. Surprisingly, the flow of Ar/He gas mixture along the central bore of nozzle 30 mixing with the powder carried by argon gas provides the proper combination for welding using the parameters set forth for this invention. A satisfactory weld was not achievable using only argon gas as set forth in the prior art teachings.

Figure 5:
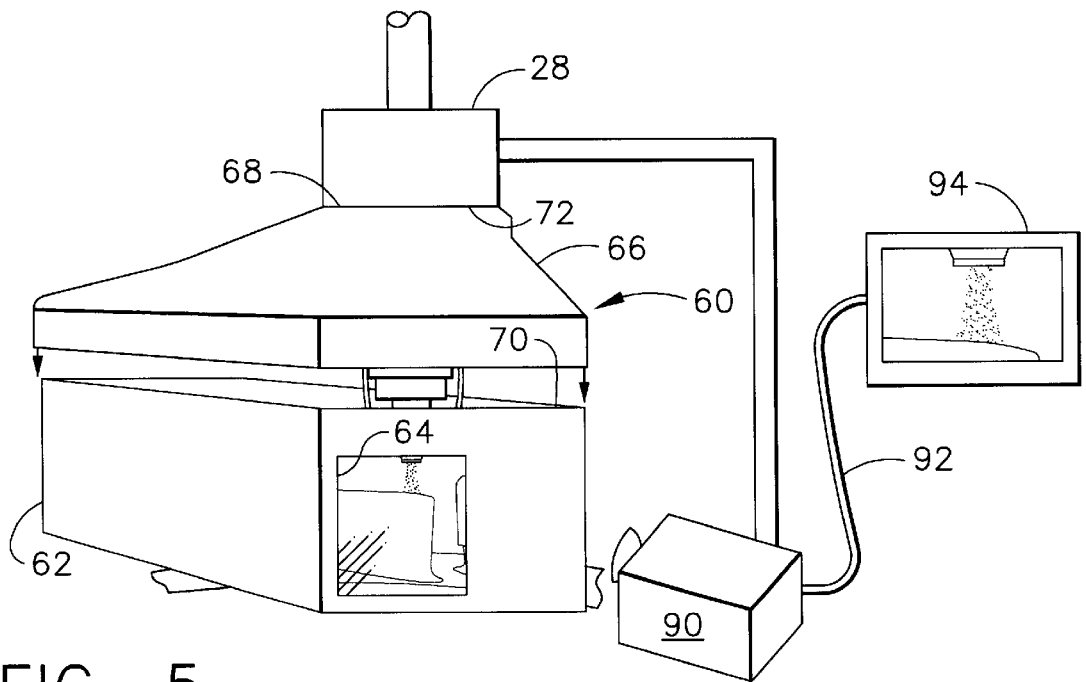
FIG. 5 is a schematic of the dry box enclosure with the video monitoring system of the present invention.

The welding is accomplished in a fixture having a viewing window. A schematic of the fixture, an enclosure used for this welding, is shown in FIG. 5. This fixture or dry box 60 was used to shield adjacent areas of the blisk assembly from weld spatter, reflected heat from the laser and to maintain a protective gas atmosphere. Dry box 60 has a substantially rigid base 62 that fits over at least the blade to be welded. While base 62 may be made from any material that can sustain high temperatures, such as Inconel, Inconel 718 has been found to produce a suitable base. Base 62 is balanced on a portion of the shroud of the compressor assembly under repair and includes a window 64 for monitoring the welding operation. If no shroud is present, the dry box can be balanced on the compressor disk or hub. A seal is required between the base and the compressor. Aluminum foil provides an inexpensive and readily available gasket that forms a suitable seal. A top portion 66 is attached and sealed to the base to form a perimeter around the area to be welded. Top portion 66 is preferably comprised of aluminum foil. However, it must be flexible, regardless of the material chosen. Top portion 66 includes an aperture 68 into which at least the tip 30 of nozzle feed head fits, thereby permitting the laser beam and powder to be introduced into the interior of dry box 60. Within top portion 66, on the interior of dry box 60, is a flexible screen (not shown) comprised of a fine metallic mesh. The screen may be made of any flexible metallic material that can withstand high temperatures; however, stainless steel mesh performs the required functions satisfactorily. The purpose of the screen is to absorb laser energy in the form of reflected light from the weld pool and weld spatter so that the flexible foil forming top portion 66 does not either overheat and burn through or reflect a significant amount of laser energy back onto the blisk assembly.

The top portion 66 is an expanding chamber which allows for movement in the X, Y and Z axes during processing, while maintaining sufficient gas coverage to provide a protective atmosphere of the weld operation. Along base 62 of dry box 60 is an inlet (not shown) for inert gas, preferably argon gas. Argon gas is introduced into dry box to provide an inert gas atmosphere within the chamber to protect the weld pool and to prevent oxidation of the regions adjacent to the weld pool within the chamber from oxidizing due to the elevated temperatures. A first seal 70 is formed between top portion 66 and the base 62 of the dry box 60 to prevent leakage or at least minimize leakage of argon gas introduced into dry box. A second seal 72 is provided at aperture 68 of dry box 60 between the top portion 66 and weld head 28. The purpose of the seals is to minimize the amount of gas lost through these interfaces. Of course, argon gas flow into dry box 60 is adjusted to assure that a positive argon gas pressure is maintained and no ambient atmosphere can contaminate dry box 60. Because of the amount of motion involved in the welding of a blade, the aluminum foil forming top portion 66 of the box must be replaced with every blade. The argon gas pressure required to maintain the positive gas pressure will vary depending upon the integrity of the seals made as top portion 66 is replaced. Because of the great potential for gas leakage, an outlet for gas removal is optional and is not currently necessary. However, as means for sealing the dry box to the compressor improve, the gas flow may be reduced and a gas outlet may be added.

Window 64 is transparent, allowing for a view of the interior of dry box 60 and is preferably made of quartz. Window 64 facilitates a view of the weld from outside of the dry box, while preventing the inert atmosphere from escaping. Window 64 allows an operator to not only monitor the weld pool and weld progression, but also to monitor the standoff, that is, the distance between the feed nozzle and the part and to manually adjust the standoff if it is not correct. If proper standoff is maintained, the operator will know that the proper amount of material is being deposited as the head traverses back and forth, that is in the x-y plane, and that the upward movement in the z-direction is proper so that each succeeding layer is neither too thin or too thick. If the proper standoff is not being maintained, the operator can adjust the speed of the nozzle to correct the standoff so that it is appropriate.

Figure 6:
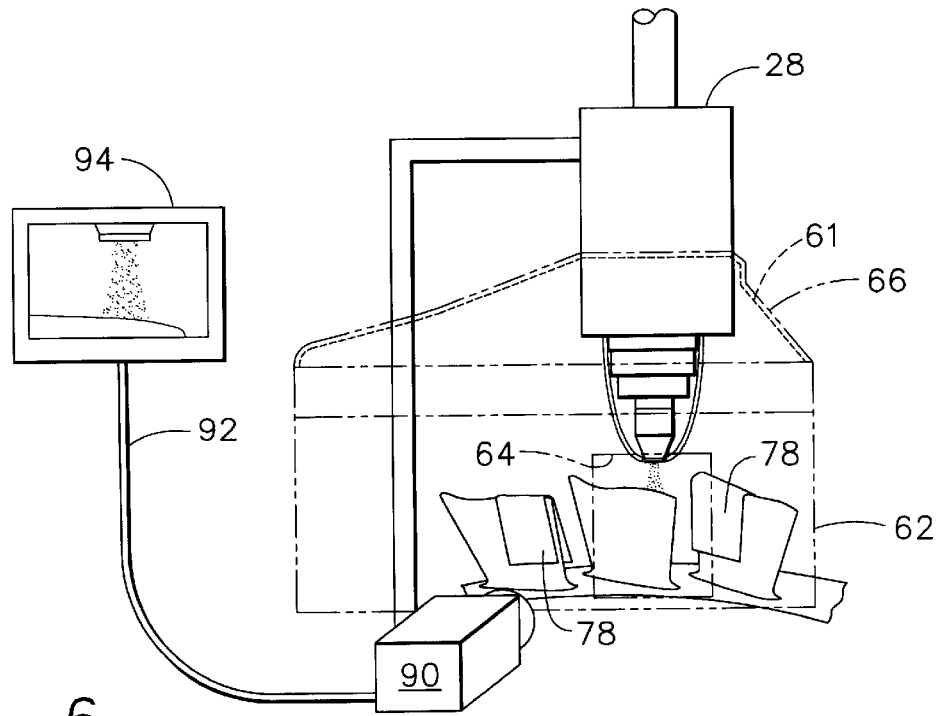
FIG. 6 is a schematic of the dry box enclosure of the present invention showing the viewing window, but with the wall adjacent to the viewing window cut away so that the enclosure interior can be seen, and including the video monitoring system.

To protect blades adjacent to the blade being weld repaired on the blisk, copper shielding in the form of thin copper sheet, 78 in FIG. 6, is placed over or wrapped around the blades adjacent to the blade being repaired. This minimizes the effect of laser reflections and weld spatter from the weld pool on the areas adjacent to the blade undergoing repair. Since the aluminum foil forming the perimeter must be replaced after the repair of each blade, the copper foil or sheet can be transferred to adjacent blades as the weld repairs progress.

Referring now to FIG. 6 which represents a schematic of the dry box and the monitoring system, a video system is used to monitor the welding operations through window 64. Outside window 64, a camera 90 is mounted for monitoring the welding operation as it progresses. Camera 90 provides a video feed through cable 92 to a remotely located monitor 94. An operator positioned at the remote location can control the motion of weld head as the operation proceeds. The operator has the ability to monitor the operation, identify any problems with the operation and override the automatic controls or alternatively to adjust or fine tune the controls as the operation proceeds. Camera 90 is affixed to weld head 28 so that camera 90 moves in unison with weld head 28. Camera 90 is aimed at the weld area substantially perpendicular to the laser beam, being focused in on the weld area through window 64. Both the tip 30 of weld head 28 and the weld zone are visible to video camera 90 during processing. Since camera 90 and nozzle tip 30 move in unison, the nozzle always appears to be stationary on monitor 94. The nominal standoff distance, defined as the distance between the nozzle tip 30 and the weld pool is marked on monitor 94 at a fixed distance below the image of nozzle tip 30. At the start of the weld sequence, nozzle tip 30 is set at a predetermined standoff. On the monitor, this is shown by marks (not shown) that represent the predetermined standoff positions. The reference marks were manual markings as actually reduced to practice. However, the marks may be electronic and may provide an automatic warning, if so desired. As the welding operation progresses and moves to the next layer, the nozzle and camera move incrementally along the z-axis. If the weld deposition rate progresses in accordance with the preprogrammed patterns, the weld and reference mark remain aligned on monitor 94. If the weld deposition rate is too high, the stand-off distance will decrease and the weld zone will appear to be between the nozzle tip 30 and the reference mark on monitor 94. The operator can correct this by overriding the controls to increase the weld speed. A higher weld speed for weld head 28 results in less deposition of material at any given position, so that weld height is lowered. Conversely, if the weld deposition rate is too low, the stand-off distance will increase and the reference mark will appear to be between the weld zone and the nozzle tip 30 on the video screen. The operator can correct this by overriding the controls to decrease the weld speed. A lower weld speed for weld head 28 results in deposition of more material at any given position, so that weld height is raised.

A blisk assembly of a XCT46 Stage 1 Core Driven Fan Stage with a five stage rear block from an IHPTET (Integrated High Performance Turbine Engine Technology) compressor similar to FIG. 1 was damaged as a result of impact due to failure of one of the blades from high cycle fatigue (HCF). As a result of the failure, all of the remaining airfoil tips represented as outer blade portions 18 in FIGS. 1 and 2 were damaged from impact with the failed blade. The blisk assembly was repaired by the apparatus and processes of the present invention.

The outer flowpath of the midspan shroud was prepared for welding using a combination of machining and hand working operations. The final machining operation was on a vertical turning lathe to provide a consistent surface for weld repair. The outer blade portions 18 to the midspan shrouds were removed. This was followed by chemically removing a small amount of material, about 0.0002", followed by wire brushing and cleaning with methyl ethyl ketone to assure the removal of all surface contaminants.

The blisk was comprised of Ti-17 having a nominal composition in weight percent of about 5% Al, 2% Sn, 2% Zr, 4% Mo, 4% Cr and the balance Ti and incidental impurities. The feed or filler metal was Ti-6242 powder having a powder particle sieve size of 35/+230 with about 3.4% of the particles (by weight) being finer than the 230 mesh size. The typical allowance was about 0.3% max. The nominal composition of the powder was about 6% Al, 2% Sn, 4% Zr, 2% Mo and the balance Ti and incidental impurities.

The geometric data to provide the programming sequence for performing the automatic laser welding were based on X and Y coordinate data taken from a Unigraphics model of the airfoil. X and Y data was used for about every 0.010 inch in the Z (radial) direction in order to create a three dimensional weld in layers. The numerically controlled programs used to machine the finished assembly were generated using a standard Unigraphics ("UG") CAM package.

The blisk was repaired by placing the apparatus of the present invention over the blade to be repaired. The repairs were accomplished by sequentially repairing blades positioned at 90° intervals around the blisk in order to prevent overheating the blisk. All welds were made using 2.5 or 3.0 KW of laser power, depending on the layer. The first three layers of the weld were deposited using 3.0 KW of laser power and 75% of the programmed speed to ensure that no lack of fusion occurred. The remainder of the weld for each blade was completed at 2.5 KW with necessary speed adjustments required to maintain weld height. The beam spot size for the laser was maintained at about 0.120 inches (0.305 cm.). The beam power for the first 3 passes was 3 KW and 2.5 KW for the remaining passes. This combination provided a power density of 265 KW per square inch (41 KW/cm$^2$) for the first three passes and 221 KW per square inch (34 KW/cm$^2$) for the remaining passes. The travel speed for the feed head was about 30 in./min. nominal, with a maximum feed rate of 36 in./min. The linear heat input was 6.5 KJ per inch and the powder feed rate is about 6 g/minute. The build-up per pass is about 0.010 inches. Acceptable weld results were achieved with helium/argon gas mixture as the inner nozzle shielding gas and argon as the carrier gas. The gas atmosphere in the dry box was argon. These parameters result in a higher heat input and a higher power density due to the laser spot size and the travel speed than previously reported, yet resulted in a very good weld with no distortion. This is surprising in that the prior art practice taught in the direction of minimizing the heat input and lowering the power density to minimize distortion resulting from the welding operation.

Ti 6-2-4-2 material in the form of powder was delivered to the weld pool through the circumferential powder feed nozzle that injects the powder coaxially with the beam as described above, the tip of the nozzle being water cooled to absorb the reflected laser energy, and the welding operations were monitored using the above-described video system to monitor and maintain consistent nozzle stand-off during the welding operation. Ti 6-2-4-2 was chosen because it has an elastic modulus that is essentially the same as the forged titanium base material.

The improved apparatus and method allows for the deposition of thinner substrates below 0.125", such as is found at the shroud of a compressor blisk assembly. Prior techniques did not allow for welding along such thin substrates. This is somewhat surprising because the slower welding speeds and higher heat inputs associated with the methods of the current invention would lead one skilled in the art to think that welding on thinner substrates would be more difficult, causing more burn-throughs. However, with the equipment and methods of the present invention, surprisingly neither burn-throughs nor weld distortions were experienced with the Ti 6-2-4-2 material as it was progressively applied to the Ti-17 base material.

Following weld repair in accordance with the present invention, the repaired blisk was given a post weld heat treatment in a vacuum for about four hours at a temperature of about 1130° F., and machined using the UG-generated milling program. The blisk was then subjected to nondestructive testing for cracks and hard alpha formation and found to be acceptable. The blisk was then installed in a compressor rig and successfully tested to 70% of maximum limits without experiencing any failure for 32 hours. During testing, a foreign object was inadvertently ingested that produced a 0.125" gouge on one repaired airfoil, but no failure resulted from the ingestion.

Although the present invention has been described in connection with specific examples and embodiments, those skilled in the art will recognize that the present invention is capable of other variations and modifications within its scope. These examples and embodiments are intended as typical of, rather than in any way limiting on, the scope of the present invention as presented in the appended claims.

What is claimed is:

1. Apparatus for repairing a blade portion of a blisk assembly using laser welding, the blisk assembly including a central disk, a plurality of blades projecting outwardly from the central disk terminating with blade tips and an optional shroud portion extending circumferentially around the blisk assembly between the central disk and the blade tips using laser welding, the apparatus comprised of:

a coaxial laser weld nozzle, the nozzle including a laser, a coaxial powder feed system, and means for cooling the nozzle, the laser having sufficient power to melt both a portion of the blisk assembly that forms a substrate and powder provided by the feed system;

a fixture for enclosing at least the blade portion under repair, the fixture including a substantially rigid base portion that is balanced on a surface of the central disk and optional shroud portion of the blisk assembly, the base portion further including a viewing window and an inlet for a supply of inert gas and an optional outlet for removing the inert gas, a first seal between the base portion and the surface, an expandable, replaceable top portion having an aperture for accepting the weld nozzle, a second seal between the top portion and the base, third seal between the top portion and the weld nozzle and a flexible mesh screen positioned between the top portion and the blade portion under repair;

a supply of inert gas connected to the base portion gas inlet;

a video system that includes a video camera, a video monitor and a line connecting the video camera to the monitor to provide a signal from the camera to the monitor, the camera positioned outside the base portion viewing window, the camera focused through the window on the portion of the blisk assembly being repaired, the camera connected to the laser nozzle so that the camera moves in unison with the laser nozzle, and measuring means associated with the video system for monitoring a distance between a tip of the nozzle and the portion of the blisk assembly under repair;

an automatic control system for moving the laser weld nozzle along a predetermined path corresponding to the blade portion under repair; and controls for overriding the automatic control system in response to the distance between the nozzle tip and the portion of the blisk assembly under repair being outside of predetermined limits.

2. The apparatus of claim 1 wherein the nozzle further includes a copper chill positioned at a tip of the nozzle adjacent to the substrate.

3. The apparatus of claim 1 wherein the system includes a supply of powder material and a supply of a carrier gas connected to the coaxial feed system of the nozzle, the carrier gas delivering the powder material to the coaxial feed system.

4. The apparatus of claim 3 wherein a supply of helium gas and a supply of argon gas are connected to the nozzle so that gas mixture enters the nozzle and passes through the nozzle coaxially with a beam provided by the laser.

5. The apparatus of claim 1 wherein the measuring means for monitoring the distance between the tip of the nozzle and the portion of the blisk assembly under repair are electronic markers responsive to changes to background intensity.

6. The apparatus of claim 1 wherein the measuring means for monitoring the distance between the tip of the nozzle and the portion of the blisk assembly under repair are marks placed on the video screen.

7. The apparatus of claim 1 wherein the measuring means for monitoring the distance between the tip of the nozzle and the portion of the blisk assembly under repair are visible marks placed on the video screen corresponding to predetermined positions of images of the nozzle tip and images of the portion of the blisk assembly under repair, images appearing on the screen outside of the marks indicating that the distance between the nozzle tip and the assembly under repair is outside of the predetermined limits.

* * * * *